(12) United States Patent
Mehta (10) Patent No.: US 8,515,979 B2
(45) Date of Patent: Aug. 20, 2013

(54) CROSS APPLICATION EXECUTION SERVICE

(75) Inventor: Japan A. Mehta, Coppell, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 155 days.

(21) Appl. No.: 12/818,243

(22) Filed: Jun. 18, 2010

(65) Prior Publication Data

US 2011/0314004 A1 Dec. 22, 2011

(51) Int. Cl.
*G06F 7/00* (2006.01)
*G06F 17/30* (2006.01)

(52) U.S. Cl.
USPC .......................................... 707/758; 707/779

(58) Field of Classification Search
None
See application file for complete search history.

(56) References Cited

U.S. PATENT DOCUMENTS

| | | | | |
|---|---|---|---|---|
| 5,101,345 | A * | 3/1992 | MacPhail | 1/1 |
| 5,301,326 | A * | 4/1994 | Linnett et al. | 719/320 |
| 5,341,478 | A * | 8/1994 | Travis et al. | 709/203 |
| 5,659,676 | A * | 8/1997 | Redpath | 715/210 |
| 6,057,845 | A * | 5/2000 | Dupouy | 715/863 |
| 6,446,135 | B1 * | 9/2002 | Koppolu et al. | 719/313 |
| 6,490,633 | B1 * | 12/2002 | Linnett et al. | 719/320 |
| 6,549,937 | B1 * | 4/2003 | Auerbach et al. | 709/206 |
| 6,631,512 | B1 * | 10/2003 | Onyeabor | 717/100 |
| 6,708,173 | B1 * | 3/2004 | Behr et al. | 1/1 |
| 7,716,664 | B2 * | 5/2010 | Hughes et al. | 717/175 |
| 8,150,838 | B2 * | 4/2012 | Allen | 707/720 |
| 8,187,004 | B1 * | 5/2012 | DeSensi et al. | 434/365 |
| 2001/0047363 | A1 * | 11/2001 | Peng | 707/104.1 |
| 2002/0037713 | A1 * | 3/2002 | Kato | 455/414 |
| 2002/0091753 | A1 * | 7/2002 | Reddy et al. | 709/202 |
| 2002/0152210 | A1 * | 10/2002 | Johnson et al. | 707/9 |
| 2003/0093260 | A1 * | 5/2003 | Dagtas et al. | 704/1 |
| 2004/0043763 | A1 * | 3/2004 | Minear et al. | 455/419 |
| 2004/0205045 | A1 * | 10/2004 | Chen et al. | 707/3 |
| 2004/0267779 | A1 * | 12/2004 | Carter et al. | 707/100 |
| 2005/0010563 | A1 * | 1/2005 | Gross et al. | 707/3 |
| 2005/0278288 | A1 * | 12/2005 | Plow et al. | 707/1 |
| 2005/0289109 | A1 * | 12/2005 | Arrouye et al. | 707/1 |
| 2006/0004699 | A1 * | 1/2006 | Lehikoinen et al. | 707/2 |
| 2006/0155689 | A1 * | 7/2006 | Blakeley et al. | 707/3 |
| 2006/0294063 | A1 * | 12/2006 | Ali et al. | 707/3 |
| 2007/0061428 | A1 * | 3/2007 | Haley et al. | 709/220 |
| 2007/0073656 | A1 * | 3/2007 | Bandi | 707/3 |
| 2007/0112844 | A1 * | 5/2007 | Tribble et al. | 707/102 |
| 2007/0150515 | A1 * | 6/2007 | Brave et al. | 707/104.1 |
| 2007/0214425 | A1 * | 9/2007 | Bala et al. | 715/764 |
| 2007/0282918 | A1 * | 12/2007 | Holloway et al. | 707/200 |
| 2008/0033954 | A1 * | 2/2008 | Brooks et al. | 707/9 |

(Continued)

OTHER PUBLICATIONS

Transparent Sharing and Interoperation of Heterogeneous Single-User Applications, Li et al, CSCW'02, pp. 246-255, Nov. 16-20, 2002.*

*Primary Examiner* — Augustine K Obisesan (57) ABSTRACT

A user device receives, from a user, a query regarding services to be performed by an application and conducts a search of metadata associated with a group of applications. The user device selects, based on the search of the metadata, potential applications, from the group of applications, that are responsive to the user query. The user device generates, based on the user query, commands to be executed by each of the potential applications. The user device generates, based on the commands, results from each of the potential applications, and formats, for presentation on a display, the results from each of the potential applications.

23 Claims, 9 Drawing Sheets

(56) References Cited

U.S. PATENT DOCUMENTS

| | | | |
|---|---|---|---|
| 2008/0201299 A1* | 8/2008 | Lehikoinen et al. | 707/3 |
| 2009/0006330 A1* | 1/2009 | Pandey et al. | 707/3 |
| 2009/0044686 A1* | 2/2009 | Vasa | 84/609 |
| 2010/0057702 A1* | 3/2010 | Ghosh et al. | 707/4 |
| 2010/0306191 A1* | 12/2010 | LeBeau et al. | 707/723 |
| 2011/0131398 A1* | 6/2011 | Chaturvedi et al. | 713/1 |
| 2011/0196852 A1* | 8/2011 | Srikanth et al. | 707/706 |
| 2011/0314002 A1* | 12/2011 | Oliver et al. | 707/722 |

\* cited by examiner

CROSS APPLICATION EXECUTION SERVICE

BACKGROUND INFORMATION

Application software, also referred to as an application, a widget, or an "app," is computer software designed to help a user perform one or more specific tasks. Apps may be downloaded to perform particular tasks for mobile electronic devices (such as personal digital assistants (PDAs), smartphones, multimedia players, gaming systems, etc.) or computing systems (PCs, laptops, netbooks, etc.). In other instances, apps may include interactive applications that may be used to supplement television programming in a subscription television system (e.g., cable, satellite, etc.). In some environments, apps may be purchased using an electronic commerce site (e.g., an "app store") and downloaded to a user's device. Thus, the user may have numerous apps stored locally on the user's device and options to purchase a multitude of other apps that perform particular functions. In some instances, it may be difficult to determine which app, of a group of apps, is best suited to perform a particular function.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide a platform to present which app, of a group of apps, is best suited to perform a requested function on a user device. The systems and/or methods may provide an application programming interface (API) to determine one or more apps, from the group of apps, that is capable of executing a particular command. The systems and/or methods may execute the one or more apps, receive results based on the user's request, and present the results to the user along with a link to the one or more apps. When an app is added to a distribution system (e.g., to be made available in an app store), the app may be registered with particular metadata to identify the app functions. The app may also be configured to conform to a particular execution input format to support the execution by the API and a return of data in a format supported by the API.

Figure 1:
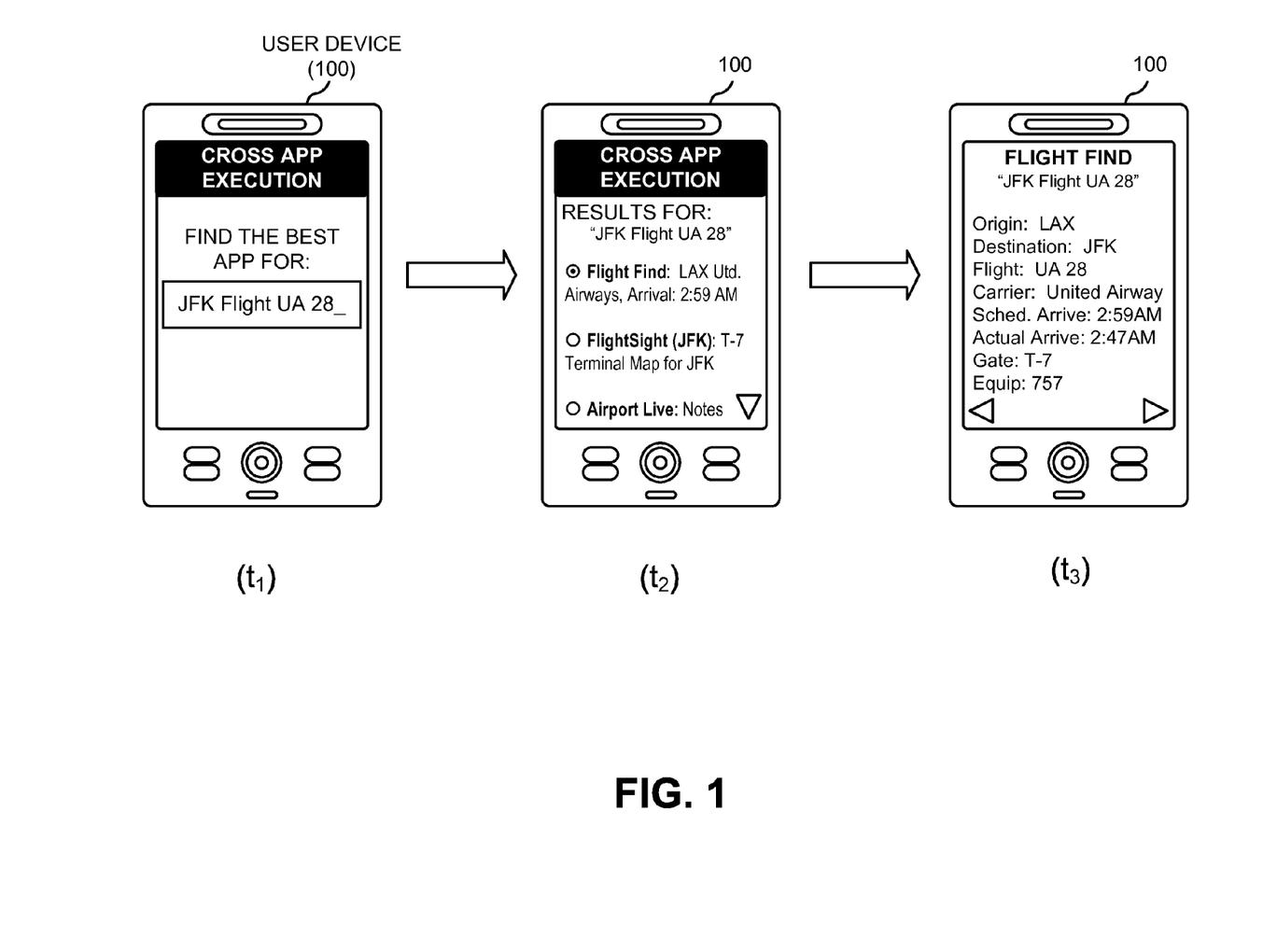
FIG. 1 provides a diagram illustrating concepts described herein.

FIG. 1 provides a diagram illustrating concepts described herein. Assume a user wants to use an application to determine an arrival time for a particular flight at a local airport. While travel-related functionality is representative, numerous other app functionalities may be used including, for example, traffic, weather, dictionary/reference, currency/mathematical conversions, sports scores, news, etc. The user may have a user device 100 that has multiple stored apps, several of which may provide travel-related functions. Rather than opening multiple apps to identify which app provides the desired functionality, the user may access a cross app execution interface on user device 100. At a time, $t_1$, the user may enter a known flight number (e.g., "JFK Flight UA 28") in the cross app execution interface. Using systems and/or methods described herein, user device 100 may search metadata associated with each stored app to identify potential apps that provide suitable functionality.

Assume for FIG. 1 that three apps with suitable functionality are identified by user device 100 (shown as "Flight Find," "FlightSight (JFK)," and "Airport Live"). User device 100 may generate a command to execute a function including "JFK Flight UA 28" in each of the three apps. At a time, $t_2$, the results (or portions of the results) from each of the three apps, along with a link to the app, may be displayed on user device 100. In one implementation, the order of the app results may be ranked (e.g., based on context, past search history, etc.). The user may select a particular app from the displayed apps, and, at a time, t3, the selected app may be opened by user device 100. In one implementation, the selected app may be opened to show the results of the originally executed command (e.g., the command for the selected app associated with "JFK Flight UA 28").

Although the above implementation is described above in the context of apps stored locally on user device 100, in other implementations, cross app execution may be applied in the context of remotely stored apps and/or a combination of locally-stored apps and remote apps. As used herein, the terms "user," "viewer," "subscriber," and "customer" may refer interchangeably to a person who interacts with, orders, uploads, listens to, or plays apps on a user device.

Figure 2:
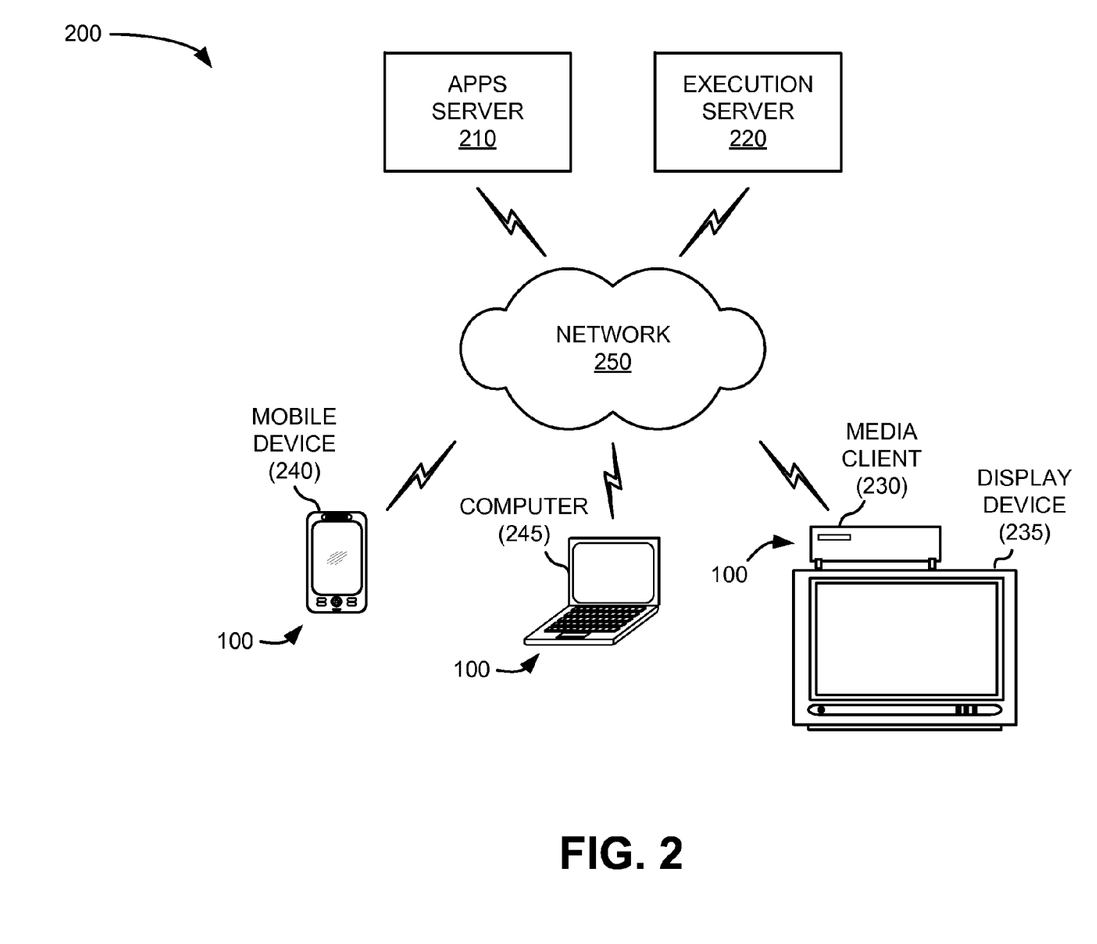
FIG. 2 depicts an example network in which systems and/or methods described herein may be implemented.

FIG. 2 is a diagram of an example network 200 in which systems and/or methods described herein may be implemented. As illustrated, network 200 may include a apps server 210, an execution server 220, a media client 230, a display device 235, a mobile device 240, a computer 245, and a network 250. Media client 230, mobile device 240, and computer 245 may be collectively referred to herein as "user devices 100" or generically as "user device 100." Components of network 200 may interconnect via wired and/or wireless connections. One apps server 210, execution server 220, media client 230, display device 235, mobile device 240, computer 245, and network 250 have been illustrated in FIG. 2. In practice, there may be more servers, media clients, display devices, mobile devices, and/or networks. Also, in some instances, one or more of the components of network 200 may perform one or more functions described as being performed by another one or more of the components of network 200.

Apps server 210 may include one or more server devices, or other types of computation or communication devices, that gather, process, search, and/or provide information in a manner described herein. Apps server 210 may provide data to push application software and content to user devices 100. For example, apps server 210 may provide apps and associated metadata that may be downloaded by user devices 100. In one implementation, apps server 210 may provide apps for a particular hardware and/or software environment. For example, apps server 210 may provide apps that are particularly configured for proprietary operating systems on media client 230, mobile device 240, or other devices. An example of apps server 210 may include a headend device or another device that provides multimedia content upon request to media client 230. Another example of apps server may include an apps store server associated with a particular mobile device and/or operating system.

In general, apps server 210 may provide access (e.g., via network 250) to apps for user devices 100, as requested by a user. Apps server 210 may communicate with a variety of other components, such as databases, gateways, web servers, network switches or routers, television broadcast facilities, and other servers to facilitate providing particular apps to customers. Apps from apps server 210 may include metadata to facilitate searching and cross execution by an apps tool that may reside on user devices 100 and/or execution server 220. In one implementation, apps server 210 may be controlled by a different entity than the entity that controls execution server 220. In another implementation, apps server 210 and execution server 220 may be controlled by the same entity (e.g., a multimedia service provider).

Execution server 220 may include one or more server devices, or other types of computation or communication devices, that gather, process, search, and/or provide information in a manner described herein. Execution server 220 may store copies of apps that may be available to execute commands/queries from user devices 100. For example, execution server 220 may perform cross execution of apps that are also stored on a user device 100 (e.g., if a user device 100 lacks sufficient processing capacity to simultaneously execute multiple apps). In another example, execution server 220 may perform execution of apps that are not stored on a user device 100 (e.g., to identify and/or market features of apps that may be of interest to a user initiating a cross app execution process).

Media client 230 may include any device capable of receiving, transmitting, and/or processing information to and/or from network 250. In one implementation, media client 230 may be a closed device (e.g., including a hardware/software configuration that is not accessible to the general public) that restricts unauthorized alteration of content delivered over network 250. In one implementation, media client 230 may receive a television signal from a backend server (not shown), may convert the signal to a form usable by display device 235, and may transmit the signal to display device 235 for display. Examples of media client 230 may include a set-top box, a computer, a cable card, and a portable electronic device. In some implementations, media client 230 may be incorporated into display device 235, such as a television, a computer, or a portable electronic device. Media client 230 may further receive and present data for apps (e.g., interactive television applications). In implementation described herein, media client 230 may also be capable of sending, via network 250, data to apps server 210, execution server 220, and/or another server to enable use of an app on display device 235. Media client 230 may include one or more devices to receive input from a user, including, for example, a remote control.

Display device 235 may include a digital or analog display via which a user may view multimedia content (including, for example, television programming and/or interactive television applications). Display device 235 may refer to any device that can receive and display multimedia content delivered over network 250 and/or through media client 230 for perception by users. Display device 235 may include technologies, such as cathode ray tube (CRT) displays, liquid crystal displays (LCDs), light-emitting diode (LED) displays, plasma displays, etc.

Mobile device 240 may include a computation or communication device, such as a wireless mobile communication device that is capable of communicating with apps server 210, execution server 220, and/or other devices. Mobile device 240 may also include capabilities to store and execute apps (e.g., apps received from apps server 210). For example, mobile device 240 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a camera, a personal gaming system, a personal media player, or another type of computation or communication device that may be capable of presenting/exchanging multimedia content. In one implementation, mobile device 240 may generate and/or store information in a memory associated with mobile device 240. Mobile device 240 may include hardware and/or software to receive data for cross execution of apps and to present the cross execution results to a user.

Computer 245 may include a computation or communication device, such as a personal computer, that is capable of communicating with apps server 210, execution server 220, and/or other devices. For example, computer 245 may include a desktop computer, a laptop, a tablet computer, a netbook, or another computation or communication device. Computer 245 may include, for example, features similar to those of mobile device 240.

Network 250 may include a network and system that permit transfer of data between apps server 210, execution server 220, and/or user devices 100. Network 250 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Network 250 may also include a radio access network that includes a variety of components, such as antennas, base transceiver stations (BTSs), base station controllers (BSCs), and/or interfaces for packet data servicing nodes (PDSNs) and/or mobile switching centers (MSCs). In one implementation, network 250 may include a video signaling and distribution network and system that permit transfer of data between apps server 210, execution server 220, media client 230, mobile device 240, and/or computer 245. In another implementation, network 250 may include a subscription television service. As used herein, a "subscription television service" may refer to television, telephone, networking and/or other multimedia services provided to customers over a closed distribution network, such as a cable, an optical fiber, a satellite, or a virtual private network that restricts unauthorized alteration of content delivered by a multimedia service provider.

In implementations described herein, app server 210 may receive (e.g., from a third-party device) both app code and metadata relating to app functionality. App server 210 may provide, to user device 100 via network 250, the app code and the metadata. User device 100 may receive, from a user, a query requesting app functionality. User device 100 may, based on the query, conduct a search of the metadata and may select, based on the search of the metadata, one or more apps that are potentially responsive to the query. User device 100 may generate, based on the query, commands to be executed by the app code associated with the potentially responsive apps. In one implementation, the commands may be executed locally in user device 100. In another implementation, the commands may be executed partially or exclusively by execution server 220, and the results from execution server 220 may be provided to user device 100. User device 100 may receive the results for the commands executed using the app code, and may format the results for presentation on a display (e.g., display device 235, an integrated display of mobile device 240, or a display associated with computer 245).

Figure 3:
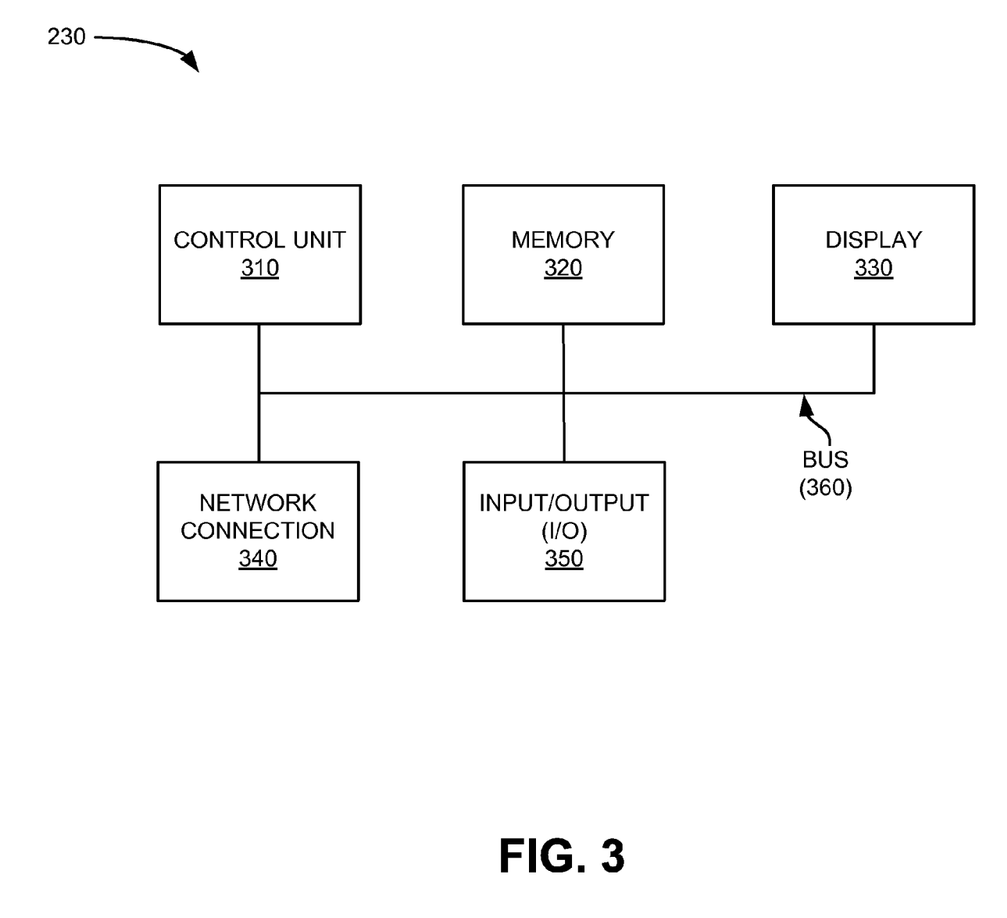
FIG. 3 is a block diagram of example components of a user device that may be used in the network of FIG. 2.

FIG. 3 is a diagram illustrating example components of media client 230. As shown, media client 230 may include a control unit 310, a memory 320, a display 330, a network connection 340, an input/output (I/O) component 350, and a bus 360.

Control unit 310 may include one or more processors, microprocessors, or another type of processing unit that interprets and executes instructions. Among other functions, control unit 310 may collect and store viewer context records, conduct metadata searches for app functions, and execute app commands. In some implementations, control unit 310 may execute instructions to send use history and/or other context information to another device, such as execution server 220. Control unit 310 may also receive information and/or instructions from other devices, such as apps server 210 or execution server 220.

Memory 320 may include one or more dynamic or static storage devices that may store information and instructions for execution by control unit 310. For example, memory 320 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Display 330 may include any component capable of providing visual information. For example, in one implementation, display 330 may be a light emitting diode (LED) or a liquid crystal display (LCD). In another implementation, display 330 may use another display technology, such as a dot matrix display, etc. Display 330 may display, for example, text (such as a time, a date or a channel selection), image, and/or video information.

Network connection 340 may include any transceiver-like mechanism that enables media client 230 to communicate with other devices and/or systems, such as apps server 210. For example, network connection 340 may include an Ethernet interface, an optical interface, a coaxial interface, a radio interface, or the like. Network connection 340 may allow for wired and/or wireless communication. Network connection 340 may be configured to connect media client 230 to a packet-based IP network.

Input/output devices 350 may generally include user input devices, such as external buttons, and output devices, such as LED indicators. With input/output devices 350, a user may generally interact with media client 230. In some implementations, input/output devices 350 may be implemented via a remote control. Bus 360 may provide an interface through which components of media client 230 can communicate with one another.

As will be described in detail below, media client 230 may perform certain operations relating to displaying information and communicating viewer activities to a server, such as apps server 210 or execution server 220. Media client 230 may perform these operations in response to control unit 310 executing software instructions contained in a computer-readable medium, such as memory 320. A computer-readable medium may be defined as a physical or logical memory device. A logical memory device may refer to memory space within a single, physical memory device or spread across multiple, physical memory devices. The software instructions may be read into memory 320 from another computer-readable medium or from another device. The software instructions contained in memory 320 may cause control unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 illustrates example components of media client 230, in other implementations, media client 230 may include fewer, different, differently arranged, or additional components than those depicted in FIG. 3. Alternatively, or additionally, one or more components of media client 230 may perform one or more other tasks described as being performed by one or more other components of media client 230.

Figure 4:
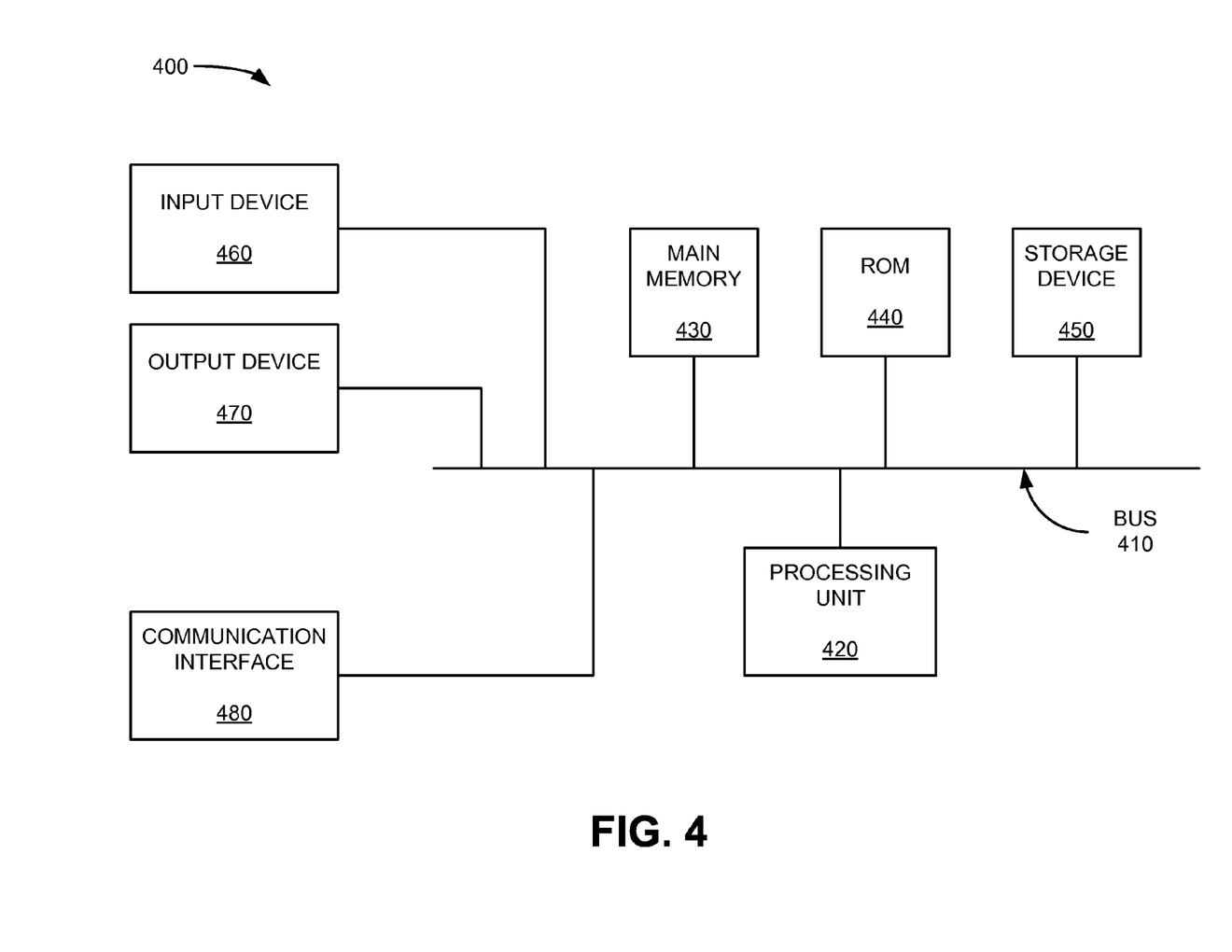
FIG. 4 is a block diagram of example components of a device that may correspond to an apps server, an execution server, or another user device of FIG. 2.

FIG. 4 is a diagram of example components of a device 400 that may correspond to apps server 210, execution server 220, computer 245, or another computing device. As illustrated, device 400 may include a bus 410, a processing unit 420, a main memory 430, a read-only memory (ROM) 440, a storage device 450, an input device 460, an output device 470, and a communication interface 480.

Bus 410 may include a path that permits communication among the components of device 400. Processing unit 420 may include one or more processors, microprocessors, or other types of processing units, such as application-specific integrated circuits (ASICs), field-programmable gate arrays (FPGAs), etc., that may interpret and execute instructions. Main memory 430 may include a RAM or another type of dynamic storage device that stores information and instructions for execution by processing unit 420. ROM 440 may include a ROM device or another type of static storage device that may store static information and instructions for use by processing unit 420. Storage device 450 may include a magnetic and/or optical recording medium and its corresponding drive. In one implementation, storage device may include a database. In one implementation, storage device 450 may store, for example, metadata for apps and viewer account activity for particular user devices 100 associated with a subscription multimedia service provider.

Input device 460 may include a mechanism that permits an operator to input information to device 400, such as a keyboard, a mouse, a pen, voice recognition and/or biometric mechanisms, a touch-screen interface, etc. Output device 470 may include a mechanism that outputs information to the operator, including a display, a printer, a speaker, etc. Communication interface 480 may include any transceiver-like mechanism that enables device 400 to communicate with other devices and/or systems, such as media client 230.

As will be described in detail below, device 400 may perform certain operations. Device 400 may perform these and other operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes that will be described later. Alternatively, hardwired circuitry may be used in place of, or in combination with, software instructions to implement processes consistent with example implementations. Thus, implementations described herein are not limited to any specific combination of hardware circuitry and software.

Although FIG. 4 illustrates example components of device 400, in other implementations, device 400 may include fewer, different, differently arranged, or additional components than those depicted in FIG. 4. In still other implementations, one or more components of device 400 may perform one or more other tasks described as being performed by one or more other components of device 400.

Figure 5:
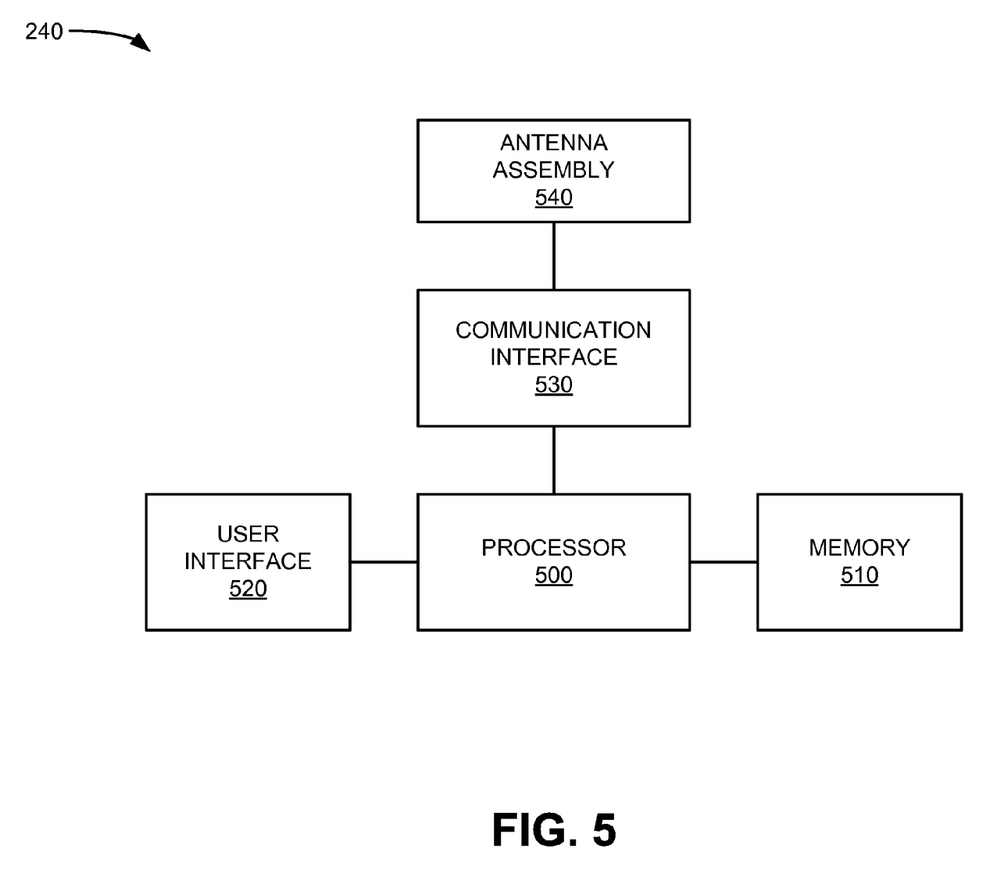
FIG. 5 is a block diagram of example components of another user device that may be used in the network of FIG. 2.

FIG. 5 is a diagram of example components of mobile device 240. As illustrated, mobile device 240 may include a processor 500, a memory 510, a user interface 520, a communication interface 530, and/or an antenna assembly 540.

Processor 500 may include one or more microprocessors, ASICs, FPGAs, or the like. Processor 500 may control operation of mobile device 240 and its components. Memory 510 may include a RAM, a ROM, and/or another type of memory to store data and instructions that may be used by processor 500. In one implementation, memory 510 may store metadata for apps and code to display and execute apps.

User interface 520 may include mechanisms for inputting information to mobile device 240 and/or for outputting information from mobile device 240. Examples of input and output mechanisms may include buttons (e.g., control buttons, keys of a keypad, a joystick, etc.); a speaker to receive electrical signals and output audio signals; a microphone to receive audio signals and output electrical signals; a display to receive touch input and/or to output visual information; a vibrator to cause mobile device 240 to vibrate; and/or a camera to receive video and/or images.

Communication interface 530 may include, for example, a transmitter that may convert baseband signals from processor 500 to radio frequency (RF) signals and/or a receiver that may convert RF signals to baseband signals. Alternatively, communication interface 530 may include a transceiver to perform functions of both a transmitter and a receiver. Communication interface 530 may connect to antenna assembly 540 for transmission and/or reception of the RF signals.

Antenna assembly 540 may include one or more antennas to transmit and/or receive RF signals over the air. Antenna assembly 540 may, for example, receive RF signals from communication interface 530 and transmit them over the air, and receive RF signals over the air and provide them to communication interface 530. In one implementation, for example, communication interface 530 may communicate with a network (e.g., network 250) and/or devices connected to a network.

As will be described in detail below, mobile device 240 may perform certain operations described herein in response to processor 500 executing software instructions of an application contained in a computer-readable medium, such as memory 510. The software instructions may be read into memory 510 from another computer-readable medium or from another device via communication interface 530. The software instructions contained in memory 510 may cause processor 500 to perform processes that will be described later. Alternatively, hardwired circuitry may be used in place of or in combination with software instructions to implement processes described herein. Thus, implementations described herein are not limited to any specific combination of hardware circuitry and software.

Although FIG. 5 shows example components of mobile device 240, in other implementations, mobile device 240 may include fewer components, different components, differently arranged components, or additional components than depicted in FIG. 5. In still other implementations, a component of mobile device 240 may perform one or more other tasks described as being performed by another component of mobile device 240.

Figure 6:
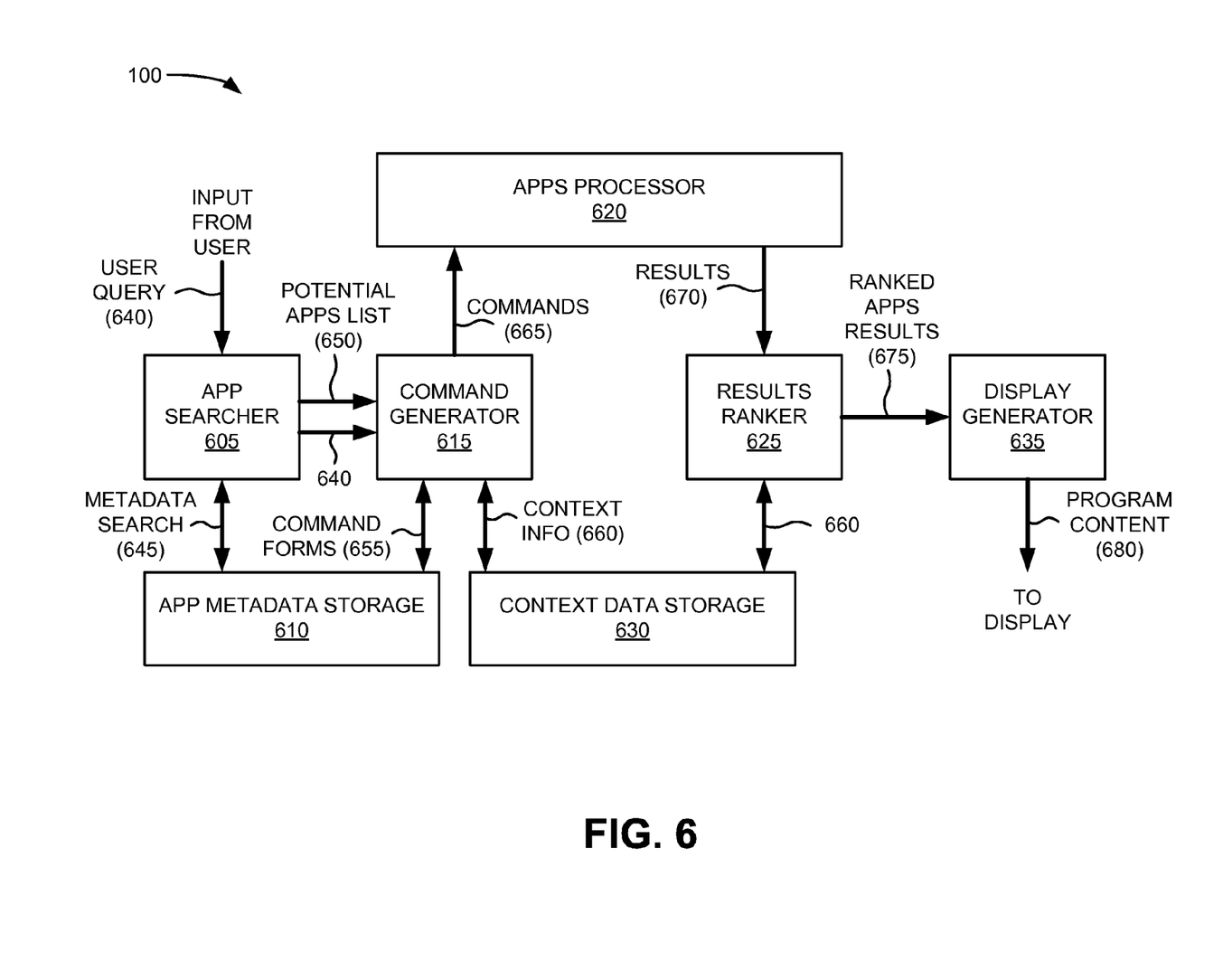
FIG. 6 depicts a diagram of functional components of a user device in FIG. 2.

FIG. 6 provides a diagram of example functional components of user device 100. As shown, user device 100 may include an app searcher 605, app metadata storage 610, a command generator 615, an apps processor 620, a results ranker 625, context data storage 630, and a display generator 635. The functions described in FIG. 6 may be performed by one or more of the example components of execution server 220, media client 230, mobile device 240, and/or computer 245 depicted in FIGS. 3-5.

App searcher 605 may include hardware or a combination of hardware and software to solicit/receive an app functionality request and to identify potential apps to facilitate the functionality request. In one implementation, app searcher 605 may search a locally-stored data source and/or a remote data source of app metadata to identify potential apps. In another implementation, app searcher 605 may be a distributed component (e.g., distributed among user device 100 and apps server 210). In one implementation, app searcher 605 may identify one or more apps not currently stored on user device 100 (e.g., that may facilitate the functionality request) for promoting new app sales.

App metadata storage 610 may include hardware or a combination of hardware and software to collect and/or store metadata associated with apps. Metadata may be generated, for example, by third parties in conjunction with uploading apps for distribution by apps server 210. Thus, metadata may be provided to app metadata storage 610 in conjunction with downloading of an app to mobile device 100 (e.g., if mobile device 100 is equipped with cross application execution functionality). Metadata may include, for example, keywords and/or other data to associate a particular app with particular functions. Additionally, or alternatively, metadata in app metadata storage 610 may include command language or command templates that may be used (e.g., by command generator 615) to generate app commands from user input. In an implementation, app metadata storage 610 may reside locally on a user device and include metadata for locally-stored apps. In another implementation, app metadata storage 610 may reside on a remote device and store app metadata for a global app database. In another implementation, app metadata storage 610 may be a distributed component (e.g., distributed among user device 100 and apps server 210).

Command generator 615 may include hardware or a combination of hardware and software to assemble commands for apps that app searcher 605 identifies as potentially having the functionality requested by the user. In one implementation, command generator 615 may retrieve command forms from app metadata storage 610 and apply terms from the user's app functionality request to generate particular commands for each app identified by app searcher 605.

Apps processor 620 may include hardware or a combination of hardware and software to execute one or more apps based on commands from command generator 615. In one implementation, apps processor 620 may execute apps stored locally on user device 100. In other implementations, apps processor 620 may execute apps on a remote device (e.g., execution server 220).

Results ranker 625 may include hardware or a combination of hardware and software to rank results obtained from apps processor 620. In one implementation, results ranker 625 may apply context data (e.g., from context data storage 630) to determine which results from apps processor 620 may be most likely to meet criteria of the user's app functionality request. In another implementation, results ranker 625 may apply popularity information associated with each app or other ranking information obtained from other users of network 200.

Context data storage 630 may store data that may be used to influence results rankings Context data may include, for example, historical data (such as browsing histories, app usage, viewed programs, and/or other usage information), user preferences, past ranking results, etc. In one implementation, context data may be associated with a particular user (e.g., a user logged into a particular account) of user device 100.

Display generator 635 may include hardware or a combination of hardware and software to present ranked results to a user of user device 100. In one implementation, display generator 635 may extract textual content from each of the rank results to present a results list. In another implementation, display generator 635 may present a split-screen or multi-screen view to display multiple app results on multiple sections of a display screen. Display generator 635 may include results for locally-stored apps (e.g., apps already stored on user device 100) and/or remote apps (e.g., apps not stored on user device 100). In one implementation, one or more remote apps may be highlighted within the ranked results list or displayed separately from the ranked results list as a promotional item.

In operation, app searcher 605 may receive input from a user in the form a user query. For example, a user may initiate a cross application execution feature on user device 100 and provide a user query 640 to identify an app for a particular function. For example, user query 640 may include the terms "convert meters to feet." App searcher 605 may communicate with app metadata storage 610 to perform a search 645 of metadata associated with locally stored apps. For example, in the case of a user device 100, app searcher 605 may perform natural language processing, a keyword search, and/or another type of search of information in app metadata storage 610 to identify locally stored apps which may correspond to the user query.

Additionally, or alternatively, user query 640 may be provided to app searcher 605 associated with apps server 210. For example, if a search of locally stored apps in user device 100 fails to identify an app for a particular function, user device 100 may forward user query 640 to app searcher 605 at apps server 210. As another example, user device 100 may forward user query 640 to app searcher 605 at apps server 210 to allow apps server 210 to promote apps that are not already stored on user device 100. In the context of apps server 210, app searcher 605 may perform natural language processing, keyword search, and/or another type of search of information in app metadata storage 610 to identify globally available apps which may correspond to user query 640. Based on metadata search 645, app searcher 605 may provide a potential apps list 650 to command generator 615.

Command generator 615 may receive potential apps list 650 and user query 640 and from app searcher 605. Command generator 615 may retrieve, from app metadata storage 610, command forms 655 for each of the apps in potential apps list 650. In one implementation, command generator 615 may also retrieve, from context data storage 630, context information 660 that may be used to supplement user query 640. For example, context information 660 may include dates, times, currently viewed programs, currently used applications, click-through information, or other context data. Command generator 615 may apply user query 640, command forms 655, and context information 660 to generate commands 665 for each of the apps in potential apps list 650. Command generator 645 may send commands 665 to apps processor 620.

Apps processor 620 may receive commands 665 and execute (e.g., simultaneously or serially) commands 665 for each application in the list of potential applications. Application processor 620 may generate results 670 for each of the apps, based on commands 665, and provide results 670 to results ranker 625. Results 670 may include images, screen shots, text, other presentation formats, and/or a link (e.g., a hyperlink to the local app or to an Internet page) to the app associated with each result. In one implementation, results 670 may include a "deep link" that provides the results page for the user query for a particular app. In another implementation, results 670 may include "teaser" information, information partially responsive to the user query, or a link to a download page, to encourage a user to purchase an app not currently downloaded on user device 100.

Results ranker 625 may receive results 670 and may rank results 670 based on a ranking algorithm. For example, results ranker 625 may rank a particular result 670 based on location of keywords and/or frequency of keywords in comparison to other results 670. In one implementation, results ranker 625 may also retrieve context information 660, from context data storage 630, to use in the ranking algorithm. Results ranker 625 may provide ranked apps results 675 to display generator 635.

Display generator 635 may receive ranked apps results 675 and format the ranked apps results 675 for presentation on a display. For example, in the context of user device 100 as media client 230, display generator 635 may format ranked apps results 675 for presentation on display device 235. In the context of user device 100 as mobile device 240, display generator 635 may format ranked apps results 675 for presentation on an integrated display screen (e.g., user interface 520).

Although FIG. 6 shows example functional components of user device 100, in other implementations, user device 100 may include fewer functional components, different functional components, differently arranged functional components, or additional functional components than depicted in FIG. 6. Additionally, or alternatively, one or more functional components of user device 100 may perform one or more other tasks described as being performed by one or more other functional components of user device 100. Furthermore, in an implementation, one or more functional components may be distributed among other devices, such as device 100, apps server 210, and/or execution server 220.

Figure 7:
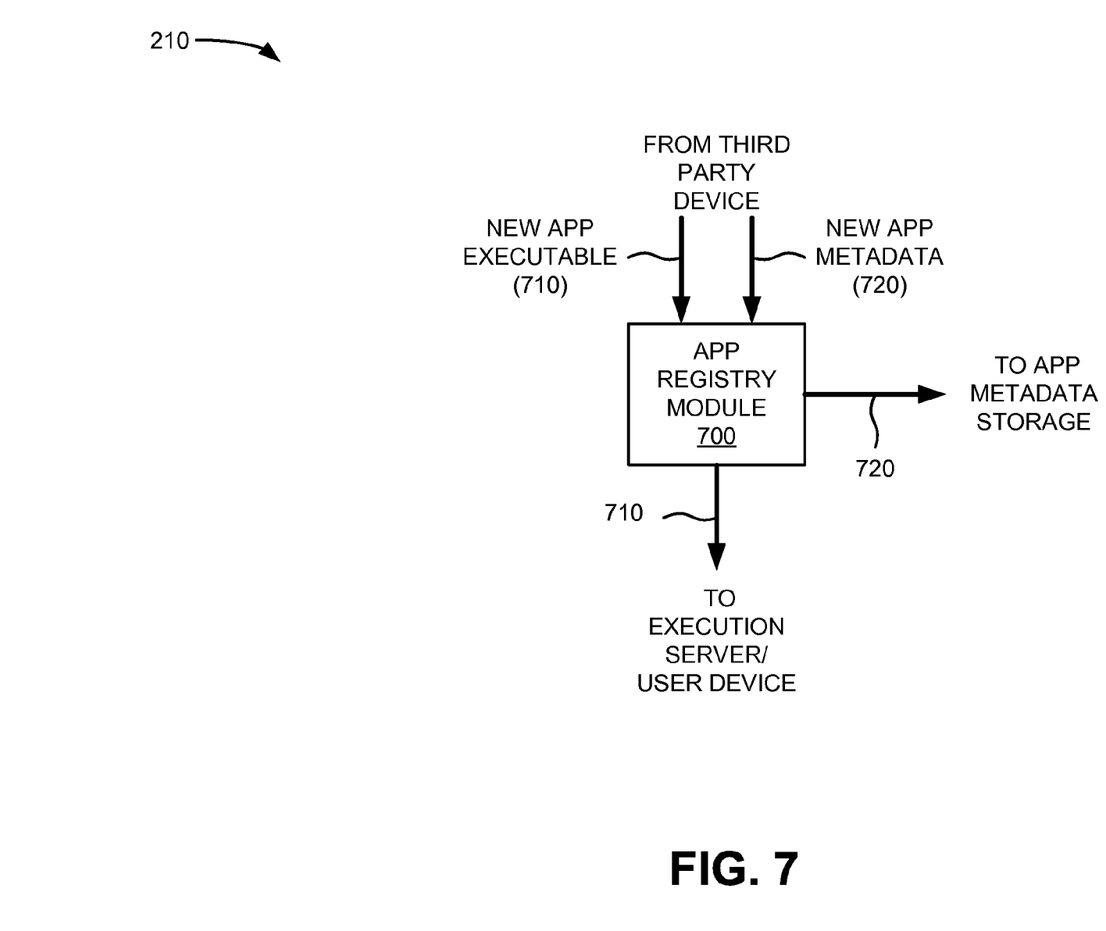
FIG. 7 depicts a diagram of functional components of an apps server in FIG. 2.

FIG. 7 provides a diagram of an example functional component of apps server 210. As illustrated, apps server 210 may include an app registry module 700. While described primarily in the context of apps server 210, some functions described in FIG. 7 may be performed by one or more of the example components of apps server 210, media client 230, mobile device 240, and/or computer 245 depicted in FIGS. 3-5.

As further shown in FIG. 7, app registry module 700 may receive (e.g., from a third party device via network 250) a new app intended for use by user devices 100. The new app may include an executable portion 710 that includes code to run the app on a user device 100 and new app metadata 720 that provides information for conducting (e.g., by app searcher 605) searches for potential apps responsive to a user query. App registry module 700 may forward executable portion 710 to an execution server (e.g., execution server 220) for executing apps in response to the user query from user device 100.

App registry module 700 may also forward executable portion 710 to user device 100 (e.g., in response to a request from user device 100 to download a particular app).

In conjunction with executable portion 710, app registry module 700 may separately (or jointly) forward new app metadata 720 to app metadata storage 610, which may reside within apps server 210 and/or user device 100. New app metadata 720 may be provided, for example, only to user devices 100 that have a cross application functionality enabled.

Although FIG. 7 shows an example functional component of apps server 210, in other implementations, apps server 210 may include different functional components, differently arranged functional components, or additional functional components than depicted in FIG. 7.

Figure 8:
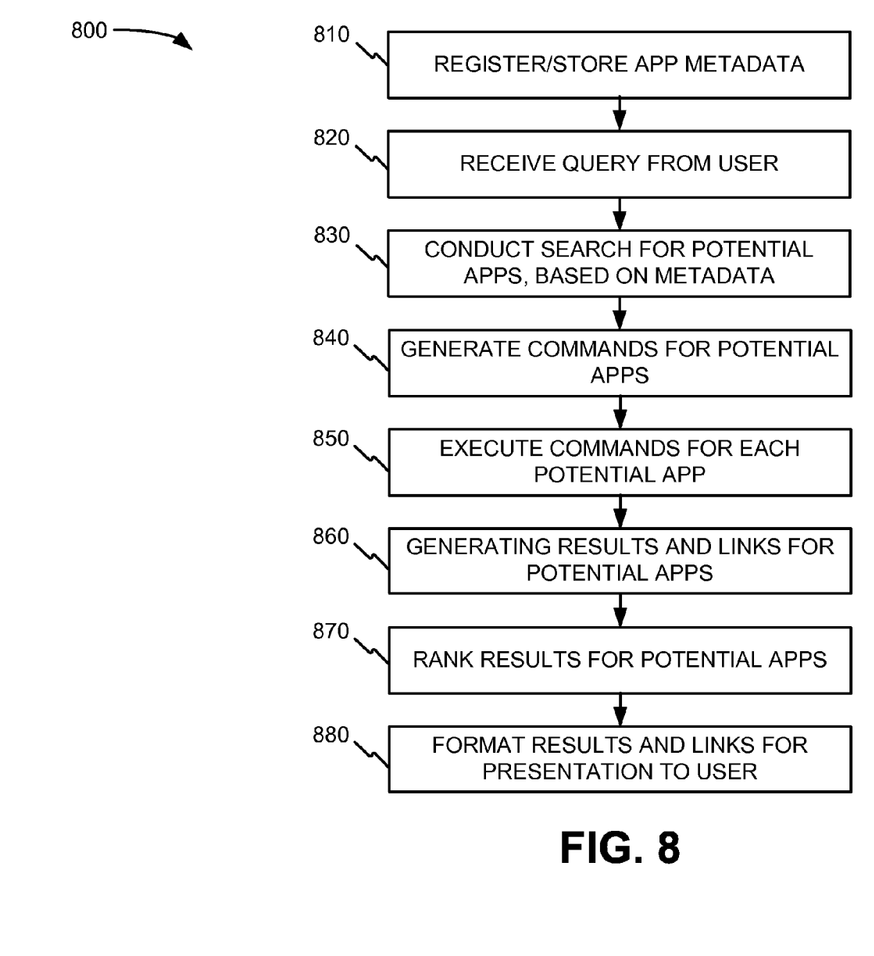
FIG. 8 is a flow chart illustrating an example process for performing a cross application execution service according to an implementation herein.

FIG. 8 provides a flow chart of an example process 800 for performing a cross application execution service. Some or all of process 800 may be performed by one or more user devices 100. In some implementations, some or all of process 800 may also be performed by one or more servers (e.g., apps server 210, execution server 220) in association with user device 100.

Process 800 may include registering and storing app metadata (block 810), receiving a request from a user (block 820), and conducting a search for potential apps based on the metadata (block 830). For example, as described above in connection with FIG. 6, metadata may be provided to app metadata storage 610 in conjunction with downloading of an app to mobile device 100. App searcher 605 may receive input from a user in the form a user query. For example, a user may initiate a cross application execution feature on user device 100 and provide a user query 640 to identify an app for a particular function. For example, user query 640 may include the terms "convert meters to feet." App searcher 605 may communicate with app metadata storage 610 to perform a search 645 of metadata associated with locally stored apps. For example, in the case of a user device 100, app searcher 605 may perform natural language processing, a keyword search, and/or another type of search of information in app metadata storage 610 to identify locally stored apps which may correspond to the user query.

Process 800 may also include generating commands for potential apps (block 840). For example, as described above in connection with FIG. 6, command generator 615 may receive potential apps list 650 and user query 640 and from app searcher 605. Command generator 615 may retrieve, from app metadata storage 610, command forms 655 for each of the apps in potential apps list 650. In one implementation, command generator 615 may also retrieve, from context data storage 630, context information 660 that may be used to supplement user query 640. For example, context information 660 may include dates, times, currently viewed programs, currently used applications, click-through information, or other context data. Command generator 615 may apply user query 640, command forms 655, and context information 660 to generate commands 665 for each of the apps in potential apps list 650. Command generator 645 may send commands 665 to apps processor 620.

Process 800 may further include executing the commands for each potential app (block 850) and generating results and links for each potential app (block 860). For example, as described above in connection with FIG. 6, apps processor 620 may receive commands 665 and execute (e.g., simultaneously or serially) commands 665 for each app in the list of potential apps. Apps processor 620 may generate results 670 for each of the apps, based on commands 665, and provide results 670 to results ranker 625. Results 670 may include images, screen shots, text, other presentation formats, and/or a link (e.g., a hyperlink to the local app or to an Internet page) to the app associated with each result. In one implementation, results 670 may include a "deep link" that provides the results page for the user query for a particular app.

Process 800 may further include ranking the results for each potential app (block 870) and formatting the results and links for presentation to a user (block 880). For example, as described above in connection with FIG. 6, results ranker 625 may receive results 670 and may rank results 670 based on a ranking algorithm. In one implementation, results ranker 625 may rank a particular result 670 based on location of keywords and/or frequency of keywords in comparison to other results 670. Additionally, results ranker 625 may retrieve context information 660, from context data storage 630, to use in the ranking algorithm. Results ranker 625 may provide ranked apps results 675 to display generator 635. Display generator 635 may receive ranked apps results 675 and format the ranked apps results 675 for presentation on a display. For example, in the context of user device 100 as media client 230, display generator 635 may format ranked apps results 675 for presentation on display device 235. In the context of user device 100 as mobile device 240, display generator 635 may format ranked apps results 675 for presentation on an integrated display screen (e.g., user interface 520).

Figure 9:
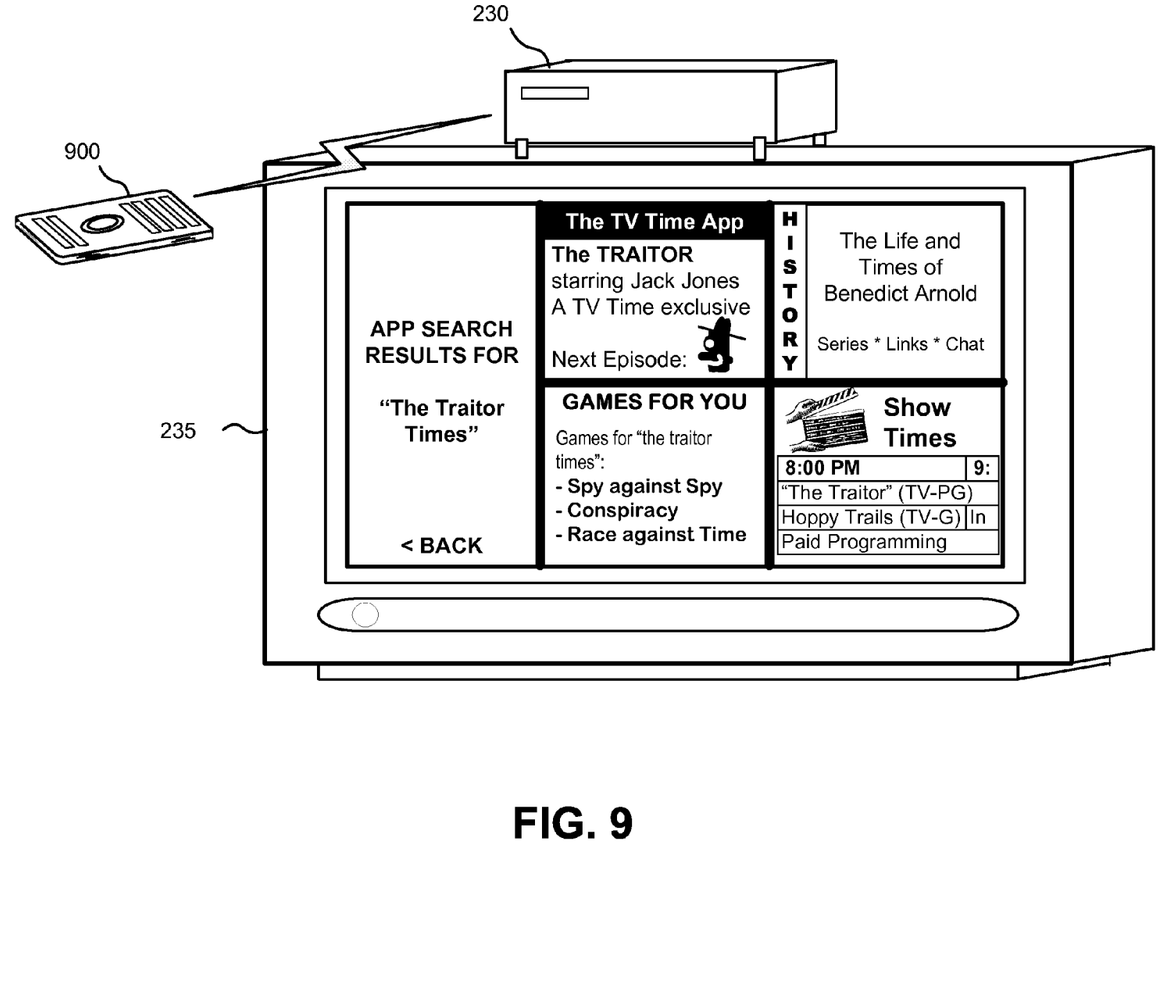
FIG. 9 is an example diagram illustrating an implementation of cross application execution service for a subscription television network according to an implementation described herein.

FIG. 9 provides an example diagram illustrating an implementation of a cross application execution service for a subscription television network according to an implementation described herein. Referring to FIG. 9, assume a subscriber (not shown) has multiple apps that reside on media client 230 or that are available to be downloaded to media client 230 (e.g., from apps server 210). Further, assume the subscriber may want to determine when the next original episode of a particular television series (e.g., "The Traitor") will be available to view. The display on display device 235 may be controlled by media client 230 as directed by user commands from a remote control 900.

The user may choose to enable use of a cross application execution service, provided on media client 230 by the subscription television network, to identify which app may best identify when the next original episode of "The Traitor" will be shown. In one implementation, the user may signal media client 230 to enable the cross application execution service using a menu screen on display device 235 (via remote control 900) or a dedicated key on remote control 900. The signal from remote control 900 may cause media client 230 to present an interface (not shown) to accept a user query. Assume the user enters the query, "The Traitor Times."

In response to the user's query in the cross application execution service, media client 230 may initiate a search (e.g., using app metadata) of apps available to media client 230. In one implementation, the search may be limited to apps stored in (e.g., previously downloaded to) media client 230. In another implementation, the search may include all apps available within the subscription television network. As described above in connection with, for example, FIG. 8, media client 230 may identify particular apps to provide a function associated with the user query "The Traitor Times," generate a command to execute each of the particular apps based on the user query, and rank the results from each app. Media client 230 may use contextual information to supplement terms from the user query and to help rank results from the executed apps.

As shown in FIG. 9, results from apps identified and ranked by media client 230 may be displayed on display device 235. Displayed app results may include an app for the television network associated with "The Traitor" (e.g., TV Time), an app for another television network associated with a program about a traitor (e.g., History), an app for a games site that may includes games about a traitor (e.g., Games for You), and an app for television program schedules (e.g., Show Times). Using, for example, remote control 900, the user may navigate to a particular screen section of display device 235 and select an app to use. Alternatively, the user may elect to return to a previous menu/screen (e.g., using a "back" option or other functionality of remote control 900).

The illustration of FIG. 9 provides an example for providing a cross application execution service. Other formats and variations may be used. For example, while FIG. 9 shows four apps as being identified by media client 230, in other implementations more or fewer apps may be displayed. Also, while app results are shown using a split-screen format, other presentation formats may be used. Furthermore, in another implementation, a user may specify a particular number of apps to display and how they are presented.

Implementations described herein may provide systems and/or methods that may receive, from a user, a query regarding services to be performed by an app, and may conduct a search of metadata associated with a group of apps. The systems and/or methods may select, based on the search of the metadata, potential apps, from the group of apps, that are responsive to the user query. The systems and/or methods may also generate, based on the user query and/or the metadata, commands to be executed by each of the potential apps. The systems and/or methods may further generate, based on the commands, results from each of the potential apps, and may format, for presentation on a display, the results from each of the potential apps.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while a series of blocks has been described with regard to the flowchart of FIG. 8, the order of the blocks may differ in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
   receiving, by a user device, a query associated with a particular function;
   conducting, by the user device, a search of metadata associated with a group of applications;
   selecting, by the user device and based on the search of the metadata, potential applications, from the group of applications, that are capable of performing the particular function;
   generating, by the user device and based on the query, a first command to be executed by a first application of the potential applications;
   generating, by the user device and based on the query, a second command to be executed by a second application of the potential applications,
      the second command being different from the first command;
   executing, by the user device, the first command by using the first application;
   receiving, by the user device, a first result from the first application;
   executing, by the user device, the second command by using the second application;
   receiving, by the user device, a second result from the second application; and
   providing, by the user device and for presentation, the first result in association with first information that identifies the first application and the second result in association with second information that identifies the second application.

2. The method of claim 1, further comprising:
   executing the first application and the second application simultaneously before executing the first command.

3. The method of claim 1, where providing the first result and the second result includes:
   determining a ranking of results, from the potential applications, that include the first result and the second result, and
   providing, for presentation, the first result and the second result based on the ranking.

4. The method of claim 3, where determining the ranking includes:
   determining the ranking based on one or more of:
      information associated with a user of the user device, or
      popularity rankings of the potential applications among other users.

5. The method of claim 1, where the user device comprises one or more of:
   a radiotelephone,
   a personal communications system (PCS) terminal,
   a personal digital assistant (PDA),
   a media client,
   a laptop computer,
   a desktop computer,
   a tablet computer,
   a camera,
   a personal media player, or
   a personal gaming system.

6. The method of claim 1, further comprising:
   receiving, by the user device and from an application server, the metadata associated with the group of applications.

7. The method of claim 6, further comprising:
   receiving code for executing the potential applications separately from the metadata, and using the code to execute the first application and the second application before executing at least one of the first command or the second command.

8. The method of claim 1, where generating the first command includes:
retrieving a command form from the metadata,
the command form including language or a template to be used for commands that are executed using the first application, and
generating the first command based on the query and the command form.

9. A non-transitory computer-readable medium storing instructions, the instructions comprising:
one or more instructions that, when executed by at least one processor, cause the at least one processor to:
receive a query associated with a particular function to be performed by a user device;
conduct, based on the query, a search of metadata associated with a group of applications;
identify, based on the search of the metadata, potential applications, from the group of applications, that are capable of performing the particular function;
generate, based on the query, a first command to be executed by a first application of the potential applications;
generate, based on the query, a second command to be executed by a second application of the potential applications,
the second command being different from the first command;
execute the first command by using the first application to generate a first result;
execute the second command by using the second application to generate a second first result; and
cause the first result to be presented in association with first information that identifies the first application and the second result to be presented in association with second information that identifies the second application.

10. The non-transitory computer-readable medium of claim 9, where the one or more instructions to cause the first result to be presented and the second result to be presented include:
one or more instructions that, when executed by the at least one processor, cause the at least one processor to:
format the first result to obtain a formatted first result,
format the second result to obtain a formatted second result, and
forward the formatted first result and the formatted second result to the user device.

11. The non-transitory computer-readable medium of claim 9, where the first result includes one or more of:
one or more images generated by the first application,
one or more screen shots generated by the first application, or
text generated by the first application.

12. The non-transitory computer-readable medium of claim 9, where the instructions further comprise:
one or more instructions that, when executed by the at least one processor, cause the at least one processor to:
store a plurality of applications available for downloading in an application server,
the plurality of applications including the group of applications.

13. The non-transitory computer-readable medium of claim 9, where the one or more instructions to cause the first result to be presented and the second result to be presented include:
one or more instructions that, when executed by the at least one processor, cause the at least one processor to:
indicate that one of the first application or the second application has not been downloaded by a user of the user device.

14. The non-transitory computer-readable medium of claim 9, where the one or more instructions to generate the first command include:
one or more instructions that, when executed by the at least one processor, cause the at least one processor to:
generate the first command based on the query and context information,
the context information including information associated with one or more of:
one or more applications that are currently being used on the user device, or
one or more programs that are currently being displayed by the user device.

15. A device comprising:
a memory to store:
a group of applications, and
metadata associated with the group of applications; and
a processor to:
receive, from a user, a query associated with a function;
conduct a search of the metadata based on the query;
select, based on the search of the metadata, potential applications, from the group of applications, that are capable of performing the function;
generate, based on the query, a first command to be executed by a first application of the potential applications;
generate, based on the query, a second command to be executed by the second application of the potential applications,
the second command being different from the first command;
execute the first command by using the first application to generate a first result;
execute the second command by using the second application to generate a second result; and
provide, for presentation, the first result in association with first information that identifies the first application and the second result in association with second information that identifies the second application.

16. The device of claim 15, where, when executing the second command, the processor is to:
execute the second command while simultaneously executing the first command.

17. The device of claim 15, where the device is one of:
a mobile device, or
a media client.

18. The device of claim 15, where, when presenting the results first result and the second result, the processor is to:
determine a ranking of results, from the potential applications, that include the first result and the second result, and
present the first result and the second result based on the ranking.

19. The device of claim 18, where the ranking is based on information associated with user activities that are performed by using the device.

20. The device of claim 15, where, when generating the first command, the processors is to:

generate the first command based on the query, a command form, and context information, the command form being language or a template associated with the first application, and the context information including information identifying one or more of the group of the applications that are currently being run or displayed by the user device.

21. A system comprising:
one or more processors to:

receive, from a user, a query associated with a particular application functionality, select a first application, from a group of applications, that is capable of performing the particular application functionality, select a second application, from the group of applications, that is capable of performing the particular application functionality, generate, based on the query, a first command to be executed by the first application, generate, based on the query, a second command to be executed by the second application, the second command being different from the first command, execute the first command by using the first application, receive a first result from the first application, execute the second command by using the second application, receive a second result from the second application, and provide, for presentation, the first result in association with first information that identifies the first application and the second result in association with second information that identifies the second application.

22. The system of claim 21, where, when generating the first command, the one or more processors are to:

generate the first command based on the query and information associated with the user.

23. The system of claim 21, where the first information includes a link to the first application.

* * * * *